United States Patent [19] | [11] Patent Number: 5,014,206
Scribner et al. | [45] Date of Patent: May 7, 1991

[54] TRACKING SYSTEM

[75] Inventors: James R. Scribner, Waterford; Raymond J. Nicholson, Rochester; Thomas G. Brown, Waterford; Anthony Caracciolo, Jr., Troy, all of Mich.

[73] Assignee: FaciliTech International Incorporated, Birmingham, Mich.

[21] Appl. No.: 234,543

[22] Filed: Aug. 22, 1988

[51] Int. Cl.[5] .......... G06F 15/50

[52] U.S. Cl. .......... 364/449; 364/443; 364/452; 342/457; 340/825.49

[58] Field of Search .......... 364/443, 424.02, 449–452; 342/50, 357, 457; 340/825.36, 825.49

[56] References Cited

U.S. PATENT DOCUMENTS

| | | | |
|---|---|---|---|
| 4,060,718 | 11/1977 | Huddle | 364/453 |
| 4,145,605 | 3/1979 | Marcus | 364/443 |
| 4,229,724 | 10/1980 | Marcus | 364/443 |
| 4,258,421 | 3/1981 | Juhasz et al. | 364/424.04 |
| 4,476,469 | 10/1984 | Lander | 340/825.49 |
| 4,688,026 | 8/1987 | Scribner et al. | 340/572 |
| 4,701,760 | 10/1987 | Raoux | 342/457 |
| 4,740,792 | 4/1988 | Sagey et al. | 342/457 |
| 4,743,913 | 5/1988 | Takai | 342/457 |
| 4,774,672 | 9/1988 | Tsunoda et al. | 364/449 |
| 4,791,572 | 12/1988 | Green, III et al. | 364/571.05 |
| 4,815,840 | 3/1989 | Benayad-Cherif et al. | 364/443 |
| 4,837,700 | 6/1989 | Ando et al. | 342/357 |
| 4,853,856 | 8/1989 | Hanway | 364/424.01 |
| 4,884,208 | 11/1989 | Marinelli et al. | 364/449 |
| 4,891,761 | 1/1990 | Gray et al. | 364/452 |
| 4,903,212 | 2/1990 | Yokouchi et al. | 364/443 |

OTHER PUBLICATIONS

"Satellite Navigation Systems", McGraw Hill Encyclopedia of Science and Technology, vol. 16, pp. 55–58.
"Loran", McGraw Hill Encyclopedia of Science and Technology, vol. 10, pp. 178–181.
Magnavox Marine and Survey Systems Division Brochure, "After Challenger: Marine Satellite Navigation at the Crossroads".
Allen Bradley Publication 2750, dated Apr. 1983.

*Primary Examiner*—Gary Chin
*Attorney, Agent, or Firm*—Harness, Dickey & Pierce

[57] ABSTRACT

A system used for determining and recording the location of a vehicle during the occurence of predetermined events. The vehicle is equipped with a sensor or sensors which respond to the occurrence of the predetermined events. The sensors are connected to a navigational system which receive positional information from a navigational transmitter. The navigational system then computes the positional information, such as latitude and longitude of the vehicle, and stores this information in a data collector on the vehicle. The date and time of day of the occurrence of the events may also be stored along with the positional information.

12 Claims, 2 Drawing Sheets

TRACKING SYSTEM

BACKGROUND OF THE INVENTION

This invention relates to an apparatus and method for tracking a vehicle and, more particularly, to an apparatus and method wherein the location of a vehicle is recorded during a predetermined event.

A wide variety of tasks are performed using vehicles. These often include pickup and delivery of persons or goods. It is sometimes desirable to have a record of the time and place of the performance of these tasks. Various methods exist for creating such records. These typically consist of simple handwritten logs kept by drivers of the vehicle, such as those commonly used by truck drivers. One of the disadvantages of existing systems for recording a vehicle's position is that they generally require manual action on the part of the driver. This can result in the recording of incorrect information or the omission of information, either unintentionally or intentionally. For this reason, it would be desirable to have a system which can determine the location of a vehicle automatically without requiring any action on the part of the operator.

In general, there are various systems which have been used for determining the location of a vehicle. These include LORAN systems and Global Positioning Systems (GPS). These systems rely on externally transmitted radio frequency signals to calculate the location of a receiving antenna mounted on the vehicle. In LORAN systems, this calculation is based on the time difference in signals received from multiple transmitters. Because the latitude and longitude of the transmitters are known, the distance from two or more transmitters can be calculated from the time lag between the reception of the plurality of signals. The resulting calculation can determine the latitude and longitude of the receiving antenna to within approximately plus or minus 20 feet.

Another type of navigational system is the GPS system. In the GPS navigation system, the transmitters are positioned on orbiting satellites. Time and location information of the satellites plus the doppler shift of the radio frequency signal received from the satellite is used to calculate the location of the receiver. GPS systems can determine location with even greater accuracy than LORAN systems.

Insofar as applicant is aware, existing systems utilizing these techniques are not particularly useful for tracking the location of a vehicle during predetermined events. This is because they are generally designed for the purpose of informing the operator of his current location. Furthermore, it is believed that these systems ordinarily do not record a history of the vehicle's location. They also do not include a means for automatically activating the navigational system in response to predetermined events.

Thus, it would be desirable to have a system which could record the latitude and longitude of a vehicle during predetermined events by means of a navigational system. It would also be desirable to have a system which would be responsive to predictable movements during these events to activate the recording of positional information without any action required by the operator or driver of the vehicle.

In accordance with the teachings of the present invention, a vehicle is equipped with a navigational system as a GPS or LORAN type system. The vehicle also is equipped with a sensor or sensors that are automatically switched upon the occurrence of a predictable or predetermined event. For example, this sensor may be a switch that closes when the passenger door of a taxi cab or bus is opened or closed. The placement of the sensor will vary depending on the particular type of information desired, and the purpose of the tracking system. The sensor will then trigger the navigational antenna system causing it to receive and process signals containing navigational information. This will permit calculation of the position of the vehicle at that time. The vehicle, in accordance with the invention, is also equipped with a data collector that has the capability of storing this information along with the time and date of the recording of the information, as well as a full identification of that specific vehicle. The stored information can then be downloaded to a data processing system and accessed immediately, or at a later time and analyzed to determine the exact location and time of the occurrence of the events.

The present invention is useful in a number of applications. These include recording the location of each pickup and dropoff point of passengers of busses and taxi cabs; recording locations of trucks or railroad cars at various times; tracking the deliveries of delivery trucks and vans; tracking the location of police cars and fire trucks and other applications where recording vehicle location and event history is desirable. To adapt the present invention to each individual application would simply require the configuring of a switch or sensor to record the occurrence of the desired event. For example, the switch may be responsive to the opening or closing of a door. Or, the event may simply be the passage of an interval of time.

The present invention is particularly useful in the waste disposal business. It is a common problem in commercial and industrial waste disposal that the location and time of each pickup and each dump by the garbage truck is not always known. This creates a number of difficulties, such as in determining the correct billing for each customer. It has been found that it is not practical to require the driver to keep records of the time and location of each pickup and dump. For this reason, it would be desirable to have a system which automatically records the time and place of each pickup and the time and place of each dump.

A further advantage of the present invention in the field of waste disposal is the ability to monitor the exact location of the dumping of hazardous waste. At present, it is possible for hazardous waste to be dumped from a garbage truck at an unauthorized or unknown location. This situation can create serious environmental problems. Using the present invention, however, when hazard waste is picked up from a particular location, regardless of whether the waste is known to be hazardous or not, there will be an exact record of the location of the pickup and also an exact record of any subsequent dumping of that waste. These records will benefit the persons disposing of the hazardous waste because he will know where his hazardous waste ends up. The records will also benefit the dump site owner because he will know, with certainty, the source of waste dumped at his dump site. Finally, the waste hauler will benefit from the ability to monitor the exact location and sequence of activities of his garbage trucks.

One embodiment of the present invention may be used to determine the source of waste products of unknown origin. In this embodiment, the navigational system is used to determine the location of the truck during pickup of waste. This information is then transferred to a portable identification tag which stores the information. The identification tag then is placed in the waste. At a later time, an RF transmitter and receiver is brought within proximity to the identification tag and transmits an activating RF signal to the tag. This causes the tag to transmit its stored information to the RF transmitter and receiver. In this way the source of the waste can be determined.

Still other advantages and uses of the present invention will become apparent to one skilled in the art upon a study of the following specification and by reference to the drawings.

DESCRIPTION OF THE PREFERRED EMBODIMENT

Figure 1:
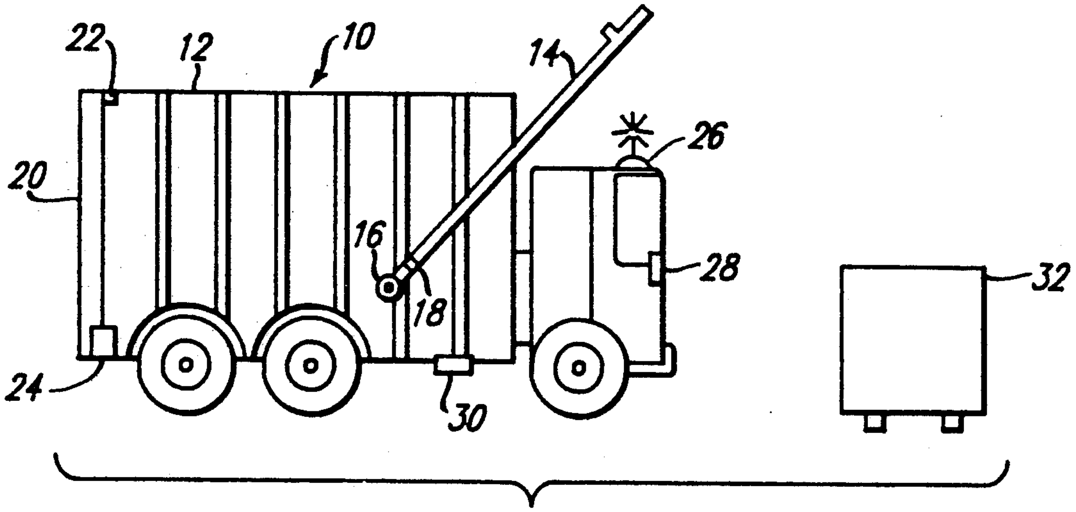
FIG. 1 is a view pictorially illustrating the various components of the invention embodied in a waste collection and disposal system.

Referring now to FIG. 1, there is illustrated a garbage truck 10 utilizing the present invention. The garbage truck 10 is of the type commonly used for commercial and industrial waste hauling. The garbage truck 10 includes a refuse compartment 12 and a lift arm 14. The lift arm 14 pivots on an axis 16 and is used to lift a commercial refuse container. As the refuse container is lifted up and over the truck's refuse compartment 12, the contents of the dumpster are emptied into the open top of the refuse compartment 12 in the usual manner. Motion of the lift arm 14 as it dumps the contents of the dumpster is sensed by a sensor 18. This sensor 18 may consist of a variety of electromechanical or optical sensors capable of making or breaking an electrical contact in response to the lifting motion of the lift arm 14. In one embodiment, sensor 18 on the lift arm 14 comprises a mercury sensor in which the tilting motion of the lift arm 12 causes motion of liquid mercury to complete an electrical circuit when the dumpster is picked up and emptied into the refuse compartment 12.

The garbage truck refuse compartment 12 is also provided with a tailgate or rear door 20 to facilitate emptying the refuse compartment 12. This is accomplished by tilting the entire refuse compartment 12 rearward, or by pushing the refuse out of the compartment 12 by mechanical means, whereupon rear door 20 rotates away from refuse compartment 12 about an axis 22. This permits the contents of the refuse compartment 12 to fall out of the compartment at an appropriate waste dump site. Motion of the rear door 20 is sensed by an appropriate sensor 24 mounted on the refuse compartment 12. This sensor 20 may be similar to the lift arm sensor 18. In one embodiment, sensor 24 is a mercury sensor which is mounted so that when the refuse compartment 12 tilts to permit emptying, an electrical circuit is completed by the mercury sensor 24.

Both the lift arm sensor 18 and the rear door sensor 24 are coupled electrically to a navigational system. In one embodiment this will comprise a GPS type navigational system 26. Both sensors 18 and 24 are also coupled to a data collector 28. The GPS system 26 is preferably mounted with its antenna on the roof of the cab of the garbage truck 10 and uses signals received from navigational satellites to calculate the latitude and longitude of the truck 10 at any given time.

Data collector 28 is preferably a microprocessor-type circuit which is coupled to both sensors 18 and 24 and also to the GPS system 26. The data collector 28 is capable of receiving and storing the latitude and longitude positional information from the GPS system 26. This information is stored when either the lift arm sensor 18 or the rear door sensor 24 are activated. The data collector 28 is also capable of distinguishing whether the positional information stored corresponds to the activation of the lift arm sensor 18 or the rear door sensor 24. For example, the identification of lift arm 14 motion and rear door 20 motion may be accomplished by assigning a first code to positional information received when the lift arm sensor 18 is activated and assigning a second code to positional information received when the rear door sensor 24 is activated. The data collector 28 also comprises a clock that permits it to also assign a date and time to the positional information each time such information is recorded. The data collector 28 also contains an interface port to permit transfer of data to an external processor. The garbage truck 10 also has a passive radio frequency transmitter or tag 30 mounted to it. For example, a tag manufactured by Allen-Bradley as part of its RF identification System may be used for the tag 30. (See, eg Allen-Bradley publications 2750-1.0 dated Apr. 1983 and Feb. 1984). One use of such an identification tag is described in U.S. Pat. No. 4,688,026 issued to James R. Scribner et al. entitled "Method of Collecting and Using Data Associated with Tagged Objects." The purpose of this transmitter 30 is to transmit the truck 10 identification number. The tag 30 is capable of transmitting the truck identification number to a base data receiver/computer unit 32 by means of radio frequency transmission. In the preferred embodiment, the data receiver/computer 32 is located at the depot where the truck is returned and kept when not in use.

When the garbage truck 10 leaves the depot, it passes near the data receiver/computer unit 32 at the truck depot, an RF signal from the receiver/computer unit 32 then causes the tag 30 to transmit the truck identification number to the receiver/computer 32. The receiver/computer 32 then records the time, date and truck identification number. Upon returning to the depot, the tag 30 again transmits the truck identification number to the data receiver/computer unit 32. The information contained in the data collector 28 may then be downloaded into the base receiver unit 32. This information will consist of coded information comprising: (1) the identification number of the garbage truck 10; (2) the date, time and latitude and longitude of each occurrence of the lift arm 14 lifting and emptying a refuse container; (3) date, time, latitude and longitude of each occurrence of the read door opening to unload the contents of the refuse compartment 12.

The data receiver/computer unit 32 also has data computing and storing capabilities. This permits the data receiver/computer unit 32 to store latitude and longitude information for each known pickup and dump location as well as the name and address of that location. Upon receiving the aforementioned data from the garbage truck 10, the receiver/computer unit 32 will first compare the latitude and longitude of actual pickup and dump sites with those of the stored known sites. The receiver/computer unit 32 will then match up the two and tabulate a chronology of the day's activities of the truck. This will include the name, address, time and date of each pickup and of each dump. Finally, this information will then be analyzed, utilized or displayed in the manner desired.

Figure 3:
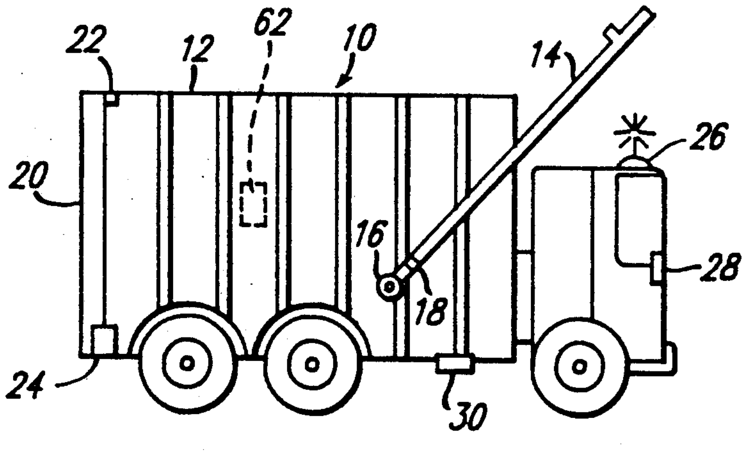
FIG. 3 is a view pictorially illustrating the waste collection and disposal system of FIG. 1 with the identification tag.

Referring now to FIG. 3, in a further embodiment of the present invention, to improve the ability to track the location of hazardous waste, a portable RF identification tag 62, capable of storing positional information, may be placed in the waste itself. This tag may be similar to the aforementioned tag 30. This tag 62 is also capable of transmitting positional information when energized by an external RF signal. Thus, when the hazardous waste is picked up, the date, time, vehicle identification code and positional information may then be transmitted directly from the data collector 28, or other source of positional information, into the identification tag 62. The RF identification tag 62 will then be placed in the hgazardous waste itself. At a later time, an RF transmitter antenna and receiver is placed sufficiently close to the tag and RF energy from the transmitter antenna and receiver will then energize the identification tag 62 and cause it to transmit the positional information it contains. The RF transmitter and receiver then will receive and store, or display, the positional information. This information may be used to determine the source of the hazardous waste. In this way, hazardous waste of unknown origin can be traced to its source.

Figure 2:
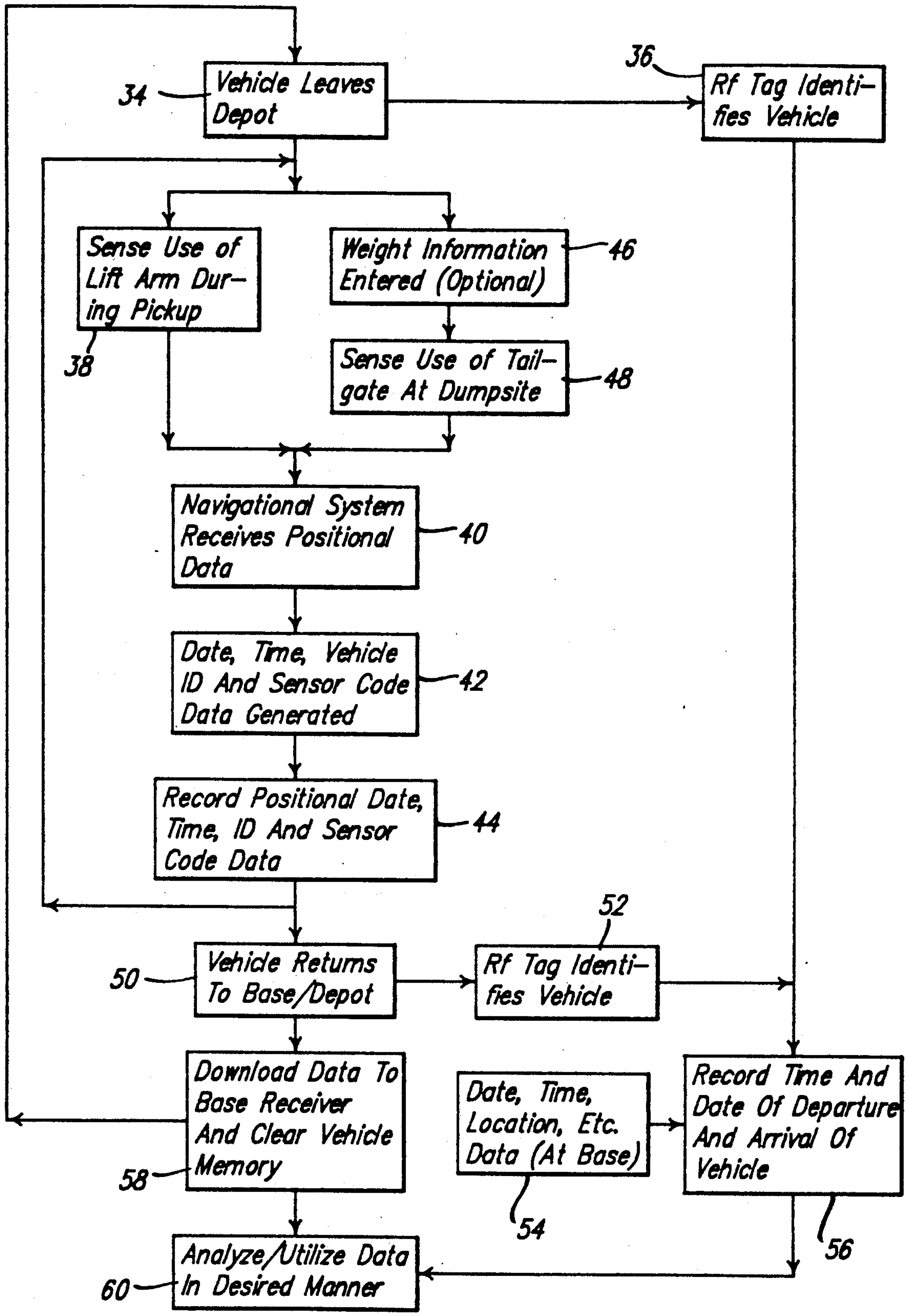
FIG. 2 is a flow chart illustrating some of the general steps used to carry out the method of this invention.

Referring now to FIG. 2, there is shown a flowchart illustrating the steps performed by the various components to achieve the advantages of the present invention. Initially, the garbage truck 10 leaves the depot as indicated by step 34. An RF signal from the receiver/computer 32 will cause the identification tag 30 to transmit a signal containing the vehicle identification number, as indicated by step 36. The garbage truck 10 will then proceed to pickup sites where the lift arm 14 will be utilized in emptying refuse containers into the truck 10. The lift arm sensor 18 senses this motion (step 38). The activation of sensor 18 will cause the navigational system to receive and compute positional data (step 40). This information will then be transmitted to the data collector 28 which will generate the date, time, vehicle identification and sensor code data (step 42). This data, along with the positional data, will then be recorded by the data collector (step 44). The vehicle will then likely repeat steps 38, 40, 42 and 44 as successive pickups are accomplished.

When the vehicle finally proceeds to a dump sight or incinerator, the weight of the truck may be optionally entered (step 46). When the truck is emptied, rear door or tail gate sensor 24 will then be activated by motion of the rear door (step 48). The activation of the rear door sensor 24 will then cause the navigational system to receive data, (step 40) and the data collector to computer date, time, vehicle ID and sensor code (step 42). The data collector will then store this information (step 44). The truck 10 may then proceed to additional pickup sites (steps 38 through 44) and additional dump sites (steps 46, 48, 40, 42 and 44). Eventually, the truck 10 will return to the depot (step 50), where upon the identification tag 30 will transmit the vehicle identification number (step 52). The depot receiver/computer unit 32 will then compute the time, date information (step 54) and then record this data along with the vehicle identification number and time and date of the truck and departures and arrivals (step 56). Next, the data stored in the data collector 28 will be downloaded into the data receiver/computer unit 32 and the data collector 28 memory will be cleared (step 58). Finally, the data in the receiver/computer unit 32 may then be analyzed and utilized in the desired manner (step 60).

From the foregoing, those skilled in the art can appreciate that the method and apparatus of this invention has significant advantages. It does not require any activity on the part of the vehicle driver and, as a result, is not subject to errors due to manually recording information. Further, the information is extremely accurate and reliable. Also, the information is transferred from the vehicle to the depot automatically without requiring any activity on the part of the vehicle driver. The resulting information is particularly important in tracking the transport and dumping of hazardous wastes. It is also useful for the waste hauler in generating invoices for billing his customers. Therefore, while this invention has been described in connection with particular examples thereof, other modifications will become apparent from those skilled in the art after a study of the specification, drawings and following claims.

What is claimed is:

1. A method of determining and recording the location of a garbage truck during the loading or unloading of said garbage truck comprising:

moving said garbage truck to a location where said loading or unloading will take place;

automatically sensing the occurrence of said loading or unloading and in response thereto collecting positional information from an existing navigational transmitter; and storing said positional information in a data collector on said garbage truck whereby a record of the location of the garbage truck during each loading or unloading is created.

2. The method of claim 1 further comprising the steps of:

transferring said positional information from said data collector to a receiver unit external to said garbage truck, wherein said receiver unit manipulates the data in said data collector and displays said data in a human readable form, said positional information comprising the latitude or longitude of the garbage truck during the loading or unloading;

collecting and storing the latitude and longitude of known waste pickup and dump sites;

comparing the stored latitude and longitude information with latitude and longitude information received form said receiver unit;

matching the latitude or longitude information from said receiver means to the known pickup or dump sites to thereby create a record of the waste pickup and dump sites where the garbage truck was loaded and unloaded.

3. The method of claim 2 further comprising the steps of:

generating and recording the date and time of each occurrence of each said loading or unloading in said data collector and transferring said date and time information to said receiver unit along with said positional information.

4. The method of claim 1 further comprising the steps of:

storing said positional information when a given batch of waste is picked up in an identification tag, wherein said identification tag can transmit said positional information and also can be activated by external RF signal;

placing said identification tag in said given batch of waste; and depositing said given batch of waste and identification tag in a land fill dump site whereby the source of said batch of waste can be determined in the future by activating said identification tag placed in said batch of waste by said external RF signal sent from an RF transmitter.

5. An apparatus for determining and recording the location of a garbage truck during the loading and unloading of said garbage truck comprising:

a tracking system on said garbage truck for receiving positional information from an existing external navigational transmitter;

first sensing means that is responsive to the motion of a lift arm on said garbage truck when waste is picked up by said garbage truck;

second sensing means responsive to the motion of a door on said garbage truck when waste is removed from said garbage truck, said tracking system being responsive to changes in the state of said first and second sensing means; and data collector unit located within said garbage truck and coupled to said tracking system, said first and second sensing means causing said tracking system to send said positional information to said data collector unit upon the occurrence of picking up or removal of waste by said garbage truck.

6. An apparatus for determining and recording the source of waste products comprising:

a vehicle for transporting said waste;

a tracking system on said vehicle for receiving positional information from an existing external navigational transmitter;

a portable identification tag storing said positional information received when said means for transporting said waste is loaded with said waste, said identification tag transmits said positional information from said portable identification tag when positional information and also can be activated by an external RF signal; and RF transmitter and receiver for transmitting an activating signal and receiving said positional information from said portable identification tag when it is brought within proximity to the identification tag, whereby when said RF transmitter and receiver is placed within proximity to said portable identification tag, said RF transmitter and receiver will activate said portable identification tag and then receive said positional information stored in said identification tag, permitting the source of the waste to be determined.

7. An apparatus for determining and recording the location of a garbage truck during the loading or unloading of said garbage truck, comprising:

a tracking system on said garbage truck for receiving positional information from an established navigational transmitter;

at least one sensing means on said garbage truck coupled to said tracking system that is responsive to predictable movements that occur on said garbage truck during said loading or unloading, said tracking system being responsive to changes in the state of said sensing means; and a data collector unit located within said garbage truck and coupled to said tracking system, said sensing means causing said tracking system to send said positional information for storage in said data collector unit upon the occurrence of said loading or unloading.

8. A method of determining and recording the location of a vehicle during the loading or unloading of said vehicle comprising the steps of:

moving said vehicle to a location where said loading or unloading will take place;

automatically sensing the occurrence of said loading or unloading and in response thereto collecting positional information from an existing navigational transmitter; and storing said positional information in a data collector on said vehicle, whereby a record of the location of the vehicle during each loading or unloading is created.

9. The method of claim 8 further comprising the steps of:

transferring said positional information from said data collector to a receiver unit external to said vehicle, wherein said receiver unit manipulates the data in said data collector and displays said data in a human readable form, said positional information comprising the latitude and longitude of the vehicle during the loading or unloading;

collecting and storing the latituide and longitude of known loading or unloading sites;

comparing the stored latitude and longitude information with latitude and longitude information received from said receiver unit; and matching the latitude and longitude information from said receiver means to the known loading or unloading sites to thereby create a record of the loading or unloading sites where the vehicle was loaded and unloaded.

10. The method of claim 9 further comprising the steps of:

generating or recording the data and time of each occurrence of each said loading and unloading in said data collector and transferring said date and time information to said receiver unit along with said positional information.

11. An apparatus for determining and recording the location of a vehicle during the loading or unloading of said vehicle comprising:

a tracking system on said vehicle for receiving positional information from an existing external navigational transmitter;

first sensing means that is responsive to the motion or a portion of said vehicle when said vehicle is loaded;

second sensing means responsive to the motion of a portion of said vehicle when said vehicle is unloaded, said tracking system being responsive to changes in the state of said first and second sensing; and data collector unit located within said vehicle and coupled to said tracking system, said first and second sensing means causing said tracking system to send said positional information to said data collector unit upon the occurrence of loading or unloading of said vehicle.

12. An apparatus for determining and recording the location of a vehicle during the loading or unloading of said vehicle comprising:

a tracking system on said vehicle for receiving positional information from an established navigational transmitter;

at least one sensing means on said vehicle coupled to said tracking system that is responsive to predictable movements that occur on said vehicle during said loading or unloading, said tracking system being responsive to changes in the state of said sensing means; and a data collector unit located within said vehicle and coupled to said tracking system, said sensing means causing said tracking system to send said positional information for storage in said data collector unit upon the occurrence of said loading or unloading.

* * * * *

UNITED STATES PATENT AND TRADEMARK OFFICE

CERTIFICATE OF CORRECTION

PATENT NO. : 5,014,206

DATED : May 7, 1991

INVENTOR(S) : James R. Scribner, et al

It is certified that error appears in the above-identified patent and that said Letters Patent is hereby corrected as shown below:

Abstract, line 2, "occurence" should be --occurrence--.

Abstract, line 6, "receive" should be --receives--.

Column 1, line 68, after "system" insert --such--.

Column 2, line 38, after "and" (second occurrence in patent and application) insert --of--.

Column 4, line 58, "read" should be --rear--.

Column 5, line 21, "hgazardous" should be --hazardous--.

Column 5, lines 58 and 59, "computer" should be --compute--.

Column 6, line 52, Claim 2, "form" should be --from--.

Column 6, line 52, Claim 2, after "unit;" insert --and--.

Column 7, line 2, Claim 4, after "by" insert --an--.

UNITED STATES PATENT AND TRADEMARK OFFICE

CERTIFICATE OF CORRECTION

PATENT NO. : 5,014,206
DATED : May 7, 1991
INVENTOR(S) : James R. Scribner, et al.

It is certified that error appears in the above-identified patent and that said Letters Patent is hereby corrected as shown below:

Column 7, line 39, Claim 6, "means" should be --vehicle--.

Column 7, line 40, Claim 6, after "waste" (second occurrence) insert --wherein--.

Column 7, line 42, Claim 6, delete "from said portable identification tag when positional information and also can be".

Column 8, line 38, Claim 9, "and" should be --or--.

Column 8, line 41, Claim 10, "data" should be --date--.

Column 8, line 52, Claim 11, "or" should be --of--.

Column 8, line 58, Claim 11, after "sensing" insert --means--.

Signed and Sealed this

Fifth Day of October, 1993

*Attest:*

BRUCE LEHMAN

*Attesting Officer* *Commissioner of Patents and Trademarks*